UNITED STATES PATENT OFFICE.

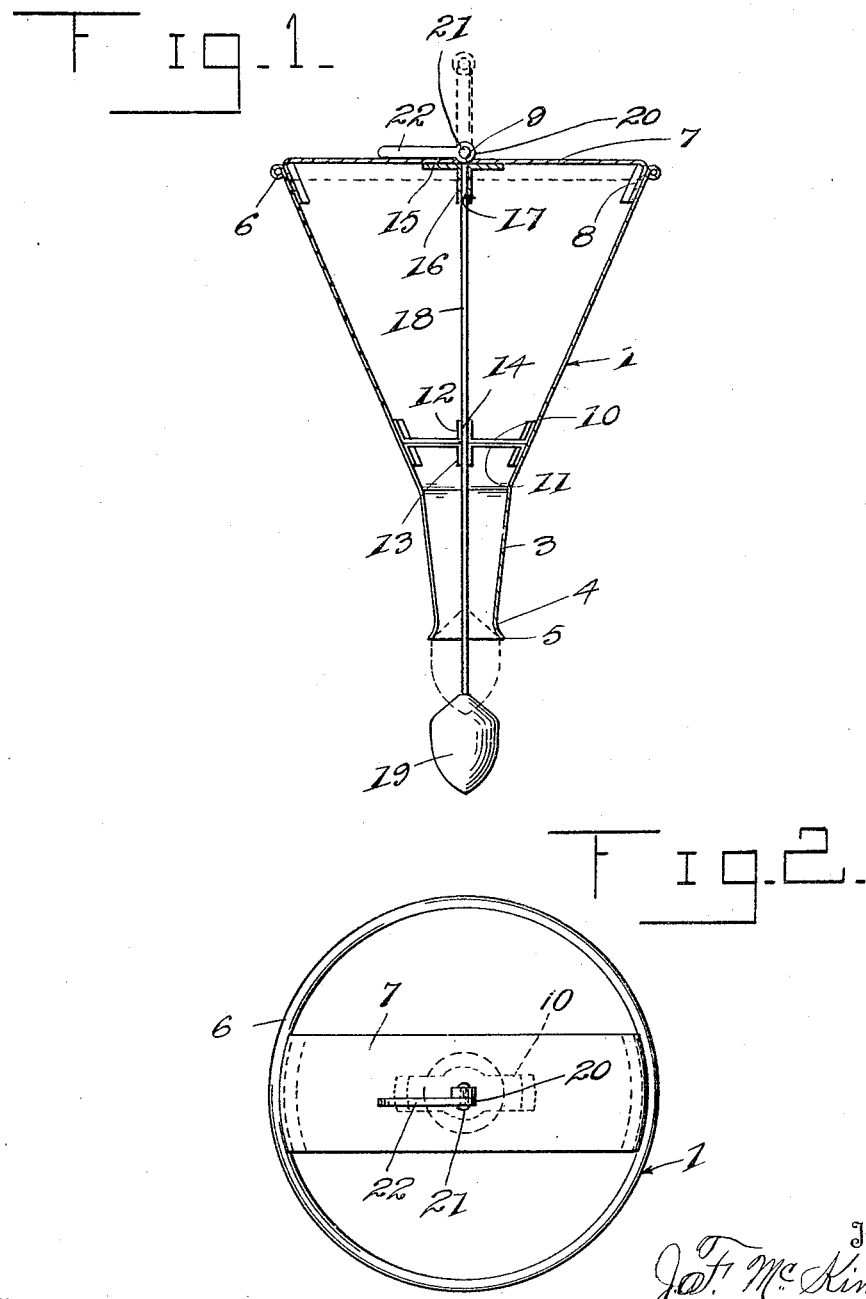

JAMES F. McKINZIE, OF LA SALLE, ILLINOIS.

FUNNEL.

1,121,857.  Specification of Letters Patent.  Patented Dec. 22, 1914.

Application filed December 29, 1913. Serial No. 809,305.

*To all whom it may concern:*

Be it known that I, JAMES F. McKINZIE, a citizen of the United States, residing at La Salle, in the county of La Salle and State of Illinois, have invented certain new and useful Improvements in Funnels; and I do hereby declare the following to be a full, clear, and exact description of the invention, such as will enable others skilled in the art to which it appertains to make and use the same.

This invention relates to new and useful improvements in funnels and has for its principal object the provision of a funnel which will automatically shut off the flow of liquid after the vessel upon which the device is being used has attained the desired quantity of liquid.

Another object of the invention is the provision of a funnel which will remain in its closed position until released by the user.

A further object of the invention is to provide a device wherein the liquid still in the funnel after the vessel has been filled will remain until such time as the user desires that the same will be removed.

With the above and other objects in view, the invention consists in the combination and arrangement of parts which will be fully set forth in the following specification and accompanying drawings, in which, Figure 1 is a longitudinal sectional view of the funnel showing the same in its open position and showing in dotted lines the valve closed in its locked position, and Fig. 2 is a top plan view of the funnel constructed in accordance with this invention.

Referring to the drawings by characters of reference, the numeral 1 designates generally a funnel constructed in accordance with this invention which comprises the conical body portion, which is provided at its lower end with the tapering tubular extension 3. The lower portion of the extension 3 is reduced as shown at 4 and provided with the flared portion 5 which forms a valve seat, the use of which will be more fully hereinafter described. The upper end of the conical body portion is preferably provided with the bead 6 as clearly shown in Fig. 1.

A suitable, transversely extending bar 7 having the down turned ends 8, is secured at diametrically opposite points to the upper edge of the casing 2 as clearly seen in Fig. 1, and is provided with the centrally located aperture 9, the use of which will appear as the description proceeds. A pair of bars 10 and 11, which are constructed in a manner similar to the bar 7, are provided and secured to the reduced end of the casing as clearly shown in Fig. 1. Each of these bars 10 and 11 are provided with the collars 12 and 13 respectively having the centrally located apertures 14 formed therein which are in direct alinement with the aperture 9 formed in the bar 7. Suitably secured to bar 7 intermediate its ends, is preferably provided the disk 15 having the annular collar 16 formed integral therewith through which the aperture 17 extends.

A suitable rod 18 which is of proper diameter to slide freely through the registering apertures in the bars 7, 10 and 11, is provided and has at its lower extremity a suitable float valve 19 which is adapted to coöperate with the valve seat 5 and to close the passage to the lower end of the tubular member 3 as clearly shown by the dotted lines in Fig. 1. The upper end of the rod 18 is preferably enlarged as clearly shown at 20 and is provided with a transverse aperture through which the rivet 21 extends. A suitable shaft 22 is pivotally secured to the bar 18 by means of the rivet 21 and is adapted to coöperate with the bar 7 to hold the valve in its normal raised position until released by the user.

It will be clearly seen from the foregoing that in use the end 3 of the funnel is placed in the desired receptacle and the liquid poured through the conical casing of the funnel. After the liquid has attained a certain height in the vessel which is being filled, it will be evident that the same will come in contact with the valve 19 and gradually raise the same until it engages the valve seat 5, during which time the stem 18 is being pushed upwardly and when the valve engages the seat 5, it will be apparent that the member 22 will assume the vertical position and hold the valve in engagement with the seat and prevent further flow of liquid through the funnel. When the user desires the contents of the funnel to be removed, it will be evident that by pushing the member 22 to either side that the valve will be permitted to fall and the contents flow through the opening in the stem 3.

While in the foregoing I have shown and described the preferred embodiment of my invention, I wish it to be understood that I may make such changes in the combination and arrangement of parts as will fall within the scope of the claim appended hereto.

Having thus described my invention, I claim:

In a device of the character described, a conical casing having a plurality of transversely extending bars secured therein, each of said bars having centrally located apertures therein, an extension formed at the lower end of the conical casing, said extension being provided with a valve seat at its lower extremity, a stem slidable through the apertures in the transversely extending bars, a valve carried by the lower extremity of the stem, and an arm pivotally secured to the upper end of the stem and adapted to swing into a vertical position when the valve is in position against the valve seat and thereby hold the valve in its closed position.

In testimony whereof I affix my signature in presence of two witnesses.

JAMES F. McKINZIE.

Witnesses:
WILLIAM L. SCHMIDT,
WILLIAM S. RAMBAUSEK.

Copies of this patent may be obtained for five cents each, by addressing the "Commissioner of Patents, Washington, D. C."